April 2, 1946.   E. S. JENKINS ET AL   2,397,489
AUTOMATIC BLADE PITCH CONTROL FOR HELICOPTER ROTOR OR AIRSCREW
Filed Nov. 6, 1943    5 Sheets-Sheet 1
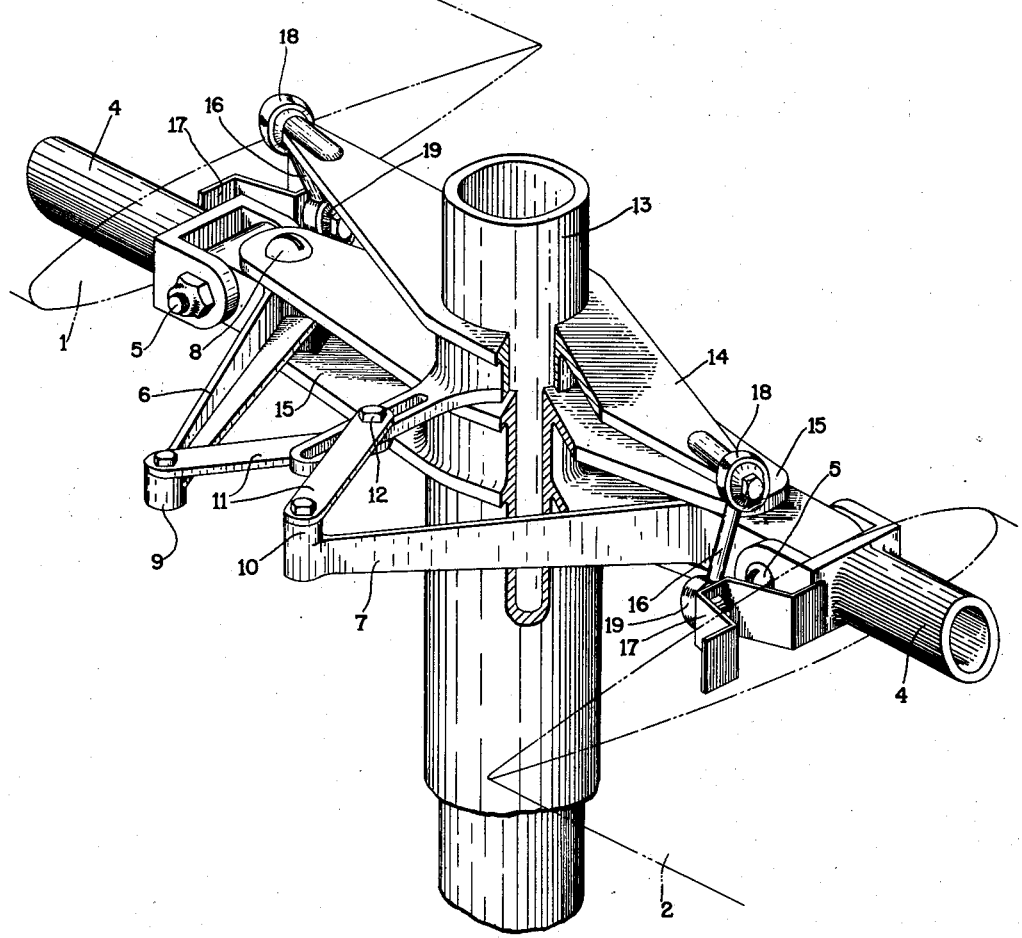
Fig. 1
INVENTOR
EDWARD S. JENKINS
ALLEN F. DONOVAN
BY 
ATTORNEY April 2, 1946. E. S. JENKINS ET AL 2,397,489
AUTOMATIC BLADE PITCH CONTROL FOR HELICOPTER ROTOR OR AIRSCREW
Filed Nov. 6, 1943 5 Sheets-Sheet 5

INVENTOR
EDWARD S. JENKINS
BY ALLEN F. DONOVAN
ATTORNEY

Patented Apr. 2, 1946

2,397,489

UNITED STATES PATENT OFFICE 2,397,489

AUTOMATIC BLADE PITCH CONTROL FOR HELICOPTER ROTOR OR AIRSCREW

Edward S. Jenkins, Snyder, and Allen F. Donovan, Kenmore, N. Y., assignors to Curtiss-Wright Corporaton, a corporation of Delaware Application November 6, 1943, Serial No. 509,312

8 Claims. (Cl. 244—17)

This invention relates to aircraft of the type generally designated as helicopters. More particularly it relates to automatic means for controlling the pitch of the several rotor blades, thus removing certain disabilities and disadvantages which have hitherto been present in craft of this type.

In the aircraft art, it is well known that certain automatic control mechanisms are desirable in order to prevent or reduce the possibility of human error. In the case of helicopters, basic control of the aircraft is attained by changes in the angles of attack of the rotor blades, or by changes in orientation of the axis of rotation of the rotor blades, or by both. The present invention is concerned with the first mentioned method of control, and attains this control in such a manner as to reduce to a tremendous extent the hazards hitherto inherent in helicopter flight. An important function of this invention is that the safety of the craft and personnel, in the event of a partial or complete failure of the power source driving the rotor, are automatically taken care of. In the event of such failure, the automatic trimming or feathering of the rotor blades to the auto-rotation position prevents the occurrence of any mishaps due to faulty judgment or slow response on the part of the operator.

At present there are two well-known means for controlling the rolling and pitching motions and also translatory motion of helicopter aircraft. One of these means is by inclination of the axis of rotation of the rotor. Another means is by cyclic variations of the pitch of individual blades such as by means of a device known as the wobble plate mechanism. One advantage of the present invention is that it may be used in combination with either of these means.

Figure 2:
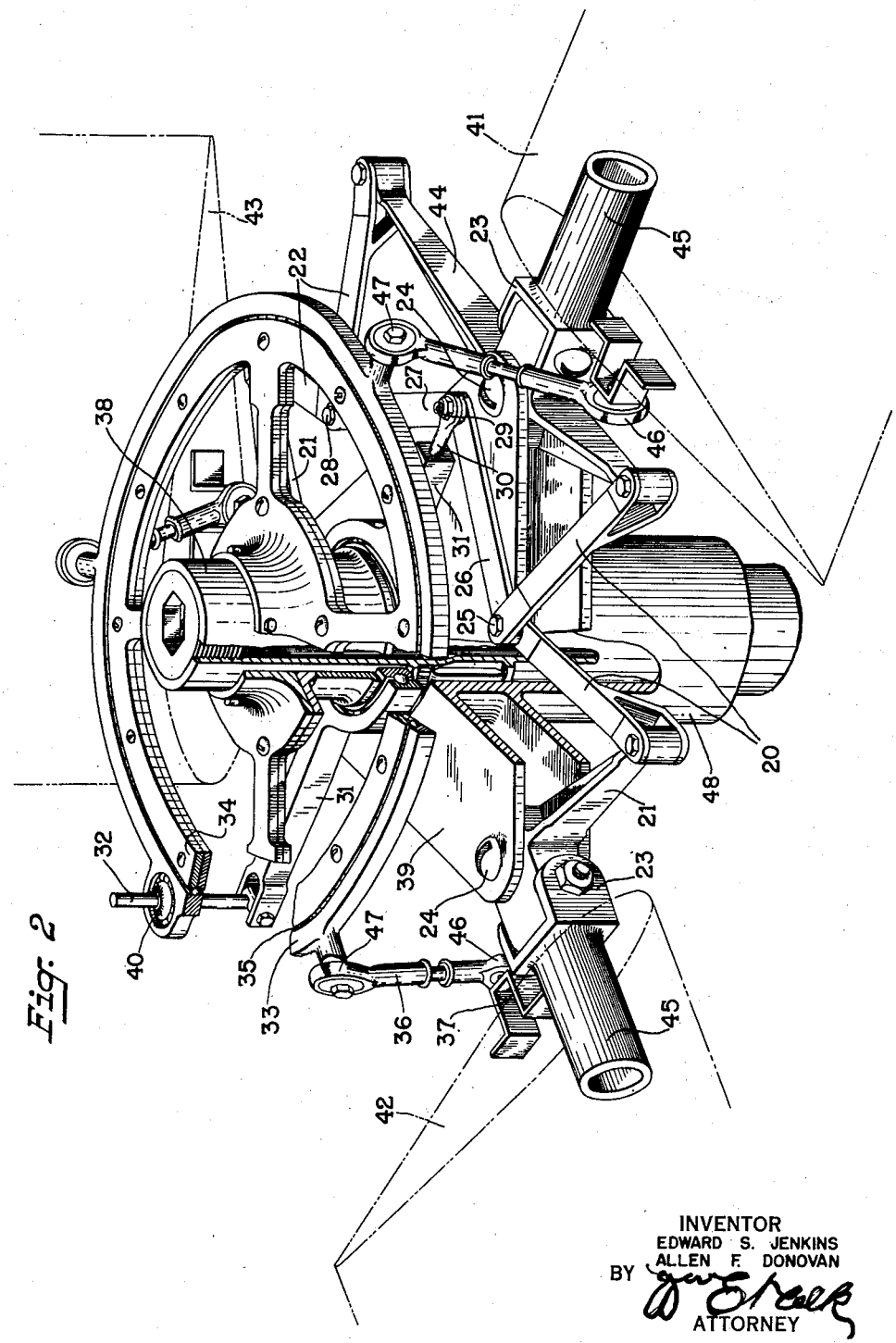
Figure 3:
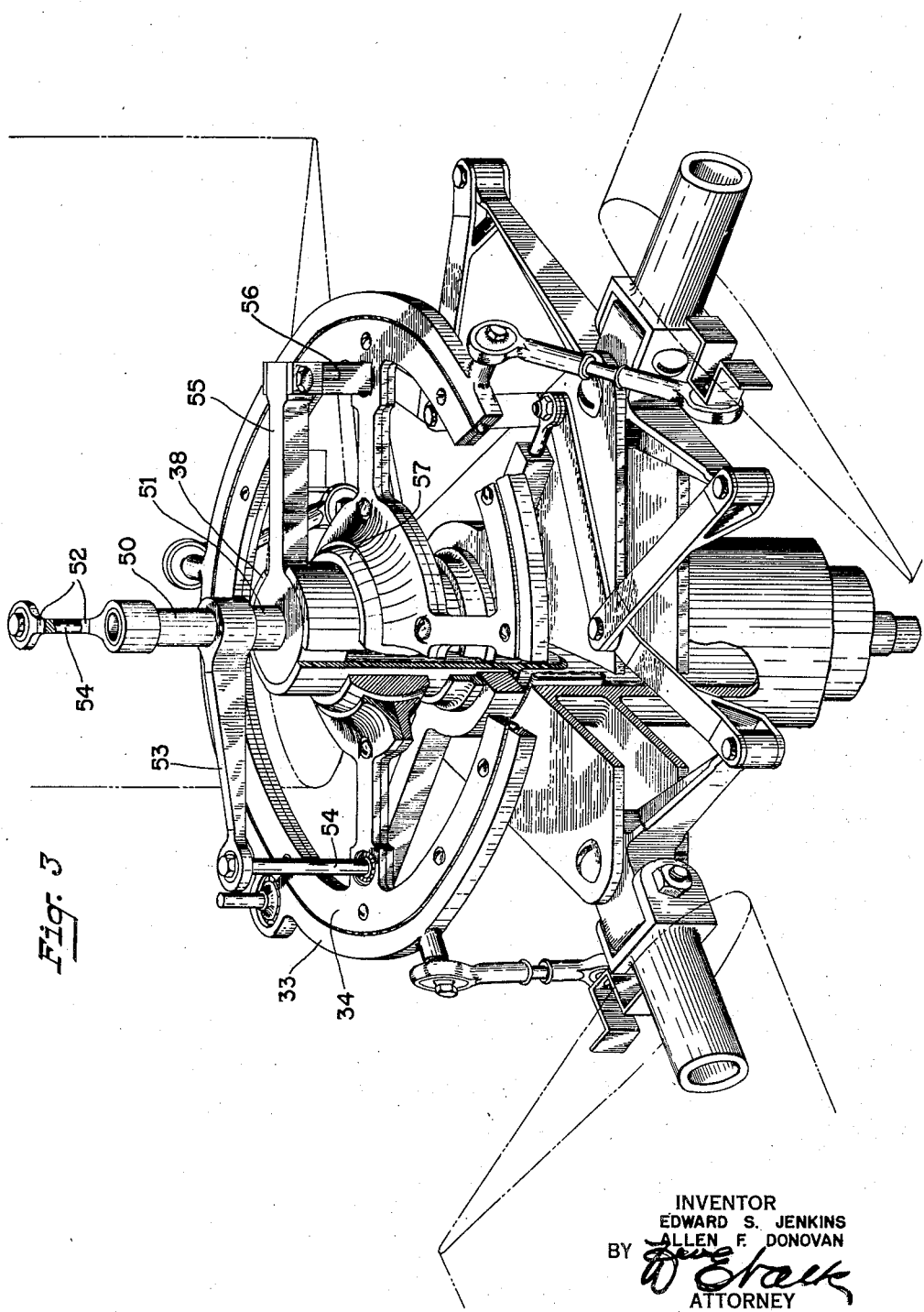
Figure 4:
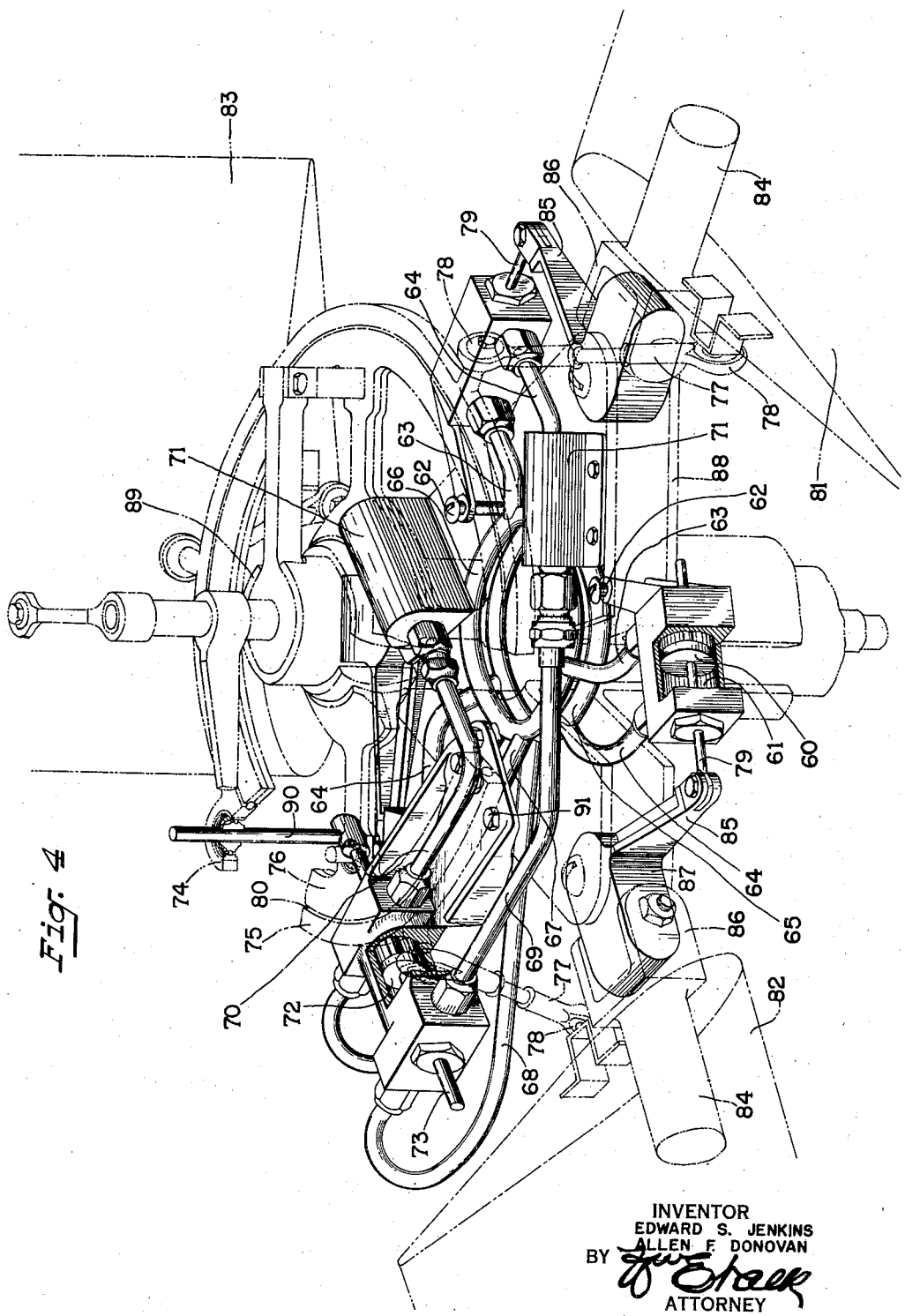
Figure 5:
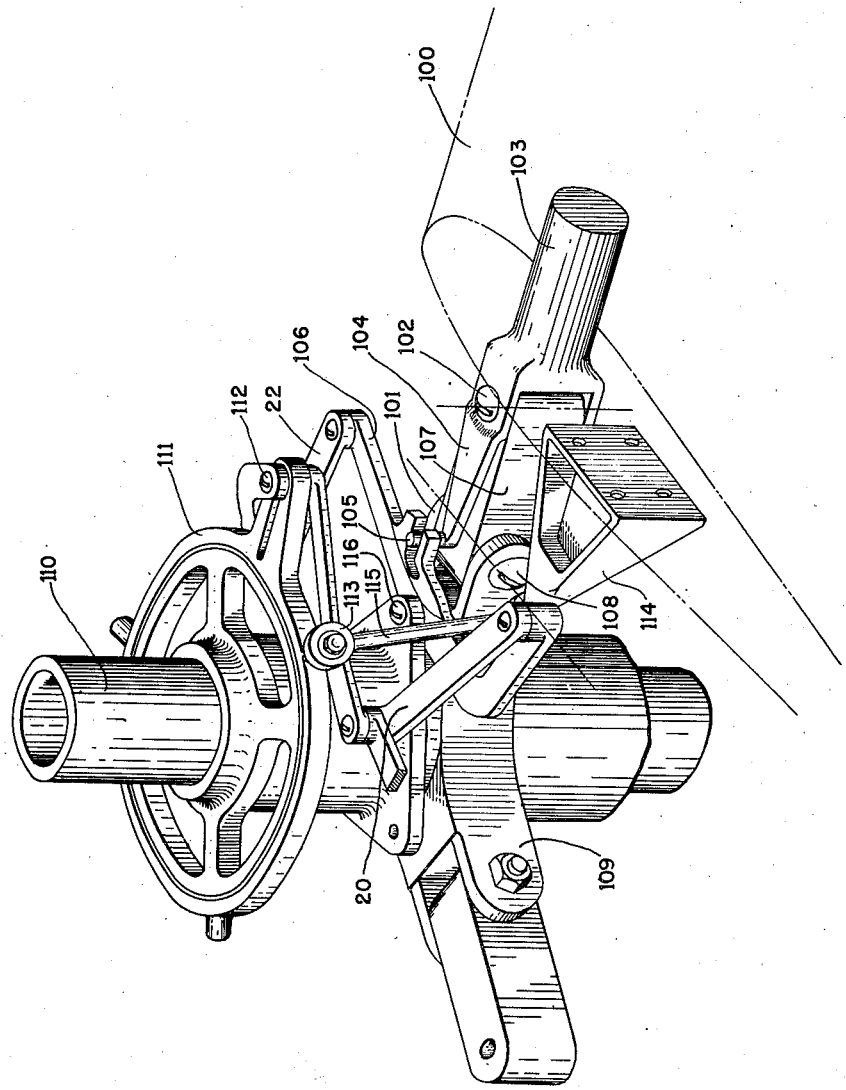

In the drawings, the power source or engine and its accompanying free wheeling clutch (providing for autorotation as necessary) are not shown. In these drawings, Figure 1 is a perspective view with parts broken away for convenience in illustration, showing a simple form of the invention applied to a two-bladed helicopter rotor adapted to be used where control is effected by inclination of the rotor axis; Figure 2 is a perspective view, also with parts broken away for convenience in illustration, of another form of the invention utilized with the same type of control, but applied to a three-bladed rotor; Figure 3 is a perspective view, also with parts broken away for convenience in illustration, of another form of the invention applied to a three-bladed rotor in combination with a wobble plate control mechanism; Figure 4 is a perspective view, also with parts broken away for convenience in illustration, of another form of the invention in which the pitch control means is hydraulic instead of mechanical, in combination with a wobble plate control mechanism; Figure 5 is a fragmentary perspective view of an arrangement of flapping and lagging hinge connections between the rotor blade and hub which may be utilized in place of the connections shown in Figures 1 to 4 inclusive.

Referring now to Figure 1, a rotor hub 15 is driven by any suitable source of power (not shown), and is mounted on stationary spindle 13. Two helicopter blades 1 and 2 are connected by means of hinges (not shown, but which may, for example, be of the type shown and described in U. S. Patent 2,121,345) to stub member 4. Changes of blade pitch are therefore accomplished by rotation of the blades 1 and 2 about the stub member 4. At the other extremities of stubs 4 are located the flapping hinges formed by pins 5, which are journaled in stubs 4 and cranks 6 and 7. The pins 8 are attached to the hub member 15 and are journaled in the cranks 6 and 7 as shown to form hinges permitting fore and aft swinging motion of the blades 1 and 2 in the plane of rotation of the blades about spindle 13 (known as "leading" and "lagging" motion). Links 11 are pinned to cranks 6 and 7 at hinges 9 and 10 and they are pinned together at hinge 12. The pin 12 slides in a groove appropriately cut in member 14, this member being capable of free rotation around spindle 13. Member 14 is connected through universal joints 18 to members 16, and the latter to blades 1 and 2 through universal joints 19 and the blade attachment fittings 17. The center of joints 19 should lie substantially on the extended axis of pin 5, in order to avoid any influence on the blade pitch angles by the flapping motion of the blades which accompanies rotation.

It is evident that any rotation of the member 14 with reference to member 15 will cause a change in the pitch angles of blades 1 and 2. A clockwise relative rotation of member 14 will result in an increase of equal amount in the pitch angles of the two blades, while a counterclockwise relative rotation of member 14 will result in an equal decrease of the blade pitch angles. Let us consider, therefore, the effect of a leading tendency on the part of blade 1 while the position of blade 2 remains unchanged. The leading tendency of blade 1 will cause pin 9 to move to the right. Since the position of pin 10 remains fixed, pin 12 also moves to the right, thus causing member 14 to rotate slightly in a counterclockwise direction. The rotation of member 14 in a counterclockwise direction is seen to cause a reduction of equal amount in the pitch angles of both blades 1 and 2. Conversely, a lagging tendency on the part of blade 1 is readily seen to result in an equal increase in the pitch angles of both blades. Should blade 1 be constrained to remain stationary and blade 2 assume a leading or lagging position, it is easily verified that such changes in position on the part of blade 2 will precisely have the same effect on the blade pitch angles as would the corresponding changes of position on the part of blade 1. Moreover, should both blades 1 and 2 lead or lag simultaneously, the resultant rotation of member 14 will be due to the sum of the two blade motions. The change in the blade pitch angles will then be approximately proportionate to the sum of the two motions. Finally, should both blades 1 and 2 either lead or lag, but the motion of the one be in the opposite sense to that of the other, it is evident that the net rotation of member 14 and hence the net change in the blade pitch angles will be proportionate to the sum of the two blade motions. It is easily seen that none of these motions in any way impairs the basic motion of the rotor blades, i. e., rotation of the entire mechanism around the axis of spindle 13.

To investigate the precise manner in which the mechanism of Figure 1 is affected by driving torque, let us consider the rotor to be in motion under the influence of a particular value of the total driving torque. Since the blades 1 and 2 are free to pivot about the hinges 8, the conditions of equilibrium require that the line of action of the resultant of the centrifugal and aerodynamic forces acting in the plane defined by the stub 4 and the pin 5 (hereinafter called the "aerodynamic drag") must pass through the axis of the leading and lagging hinge 8 of the corresponding blade. Hence, any change in either the rotor speed, and therefore the centrifugal forces, or in the rotor torque, and therefore the aerodynamic drag, will result in a change in the leading or lagging angles assumed by the blades.

Considering now the case of rotor operation at constant rotational speed, it is clear that the magnitude of the centrifugal forces remains unchanged; and so, the force component which determines the leading or lagging angle of each blade is the aerodynamic drag acting on it. For rotor operation at constant rotational speed, the aerodynamic drag on each blade is clearly proportionate to the torque absorbed by said blade. Hence, an increased blade torque will cause an increased aerodynamic drag and an increased angle of lag, while a decreased blade torque will, conversely, result in a decreased aerodynamic drag and a decreased angle of lag.

During the course of stationary or vertical flight of a helicopter, the blades of an ideal rotor operating in still air will each assume the same angle of lag and will each absorb an equal amount of the total driving torque. All of the rotor blades should then assume the same angles of attack for aerodynamic stability of the system, and this is assured by the mechanism proposed herein. In the more complicated case of translatory steady flight of the aircraft, the air velocity relative to each blade cyclically varies as each blade in turn advances and retreats relative to the air stream. Hence the torque absorbed by each blade cyclically varies. If the blade pitch angles were unrelated, this would result in wide fluctuations of these blade angles, this being apparent from a consideration of the aerodynamic behavior of the blade airfoils. From the previous description, however, it is seen that the mechanism of Figure 1 is so designed as to cause the pitch angle assumed by each blade to be a function of the total rotor driving torque and not of the individual blade torques. Since the total driving torque remains essentially constant during steady flight, and in any event varies smoothly in unsteady flight, the blade pitch variations will follow the same pattern. Hence, any violent vibratory tendencies of the rotor blades are eliminated from the system.

The previous discussion assumes that the rotor rotational velocity remains constant. However, this is not a necessary feature of the invention described herein. Constant rotational speed operation of the rotor will result only if the various parts of the mechanism are appropriately sized to give a certain unique relationship between the algebraic sum of the change in lead or lag angles of the several blades and their common variations of blade pitch. More generally, and by proper sizing of the members of the pitch control mechanisms described herein, the relationship between the algebraic sum of the change in lead or lag angles of the several blades and in their common change of blade pitch can be variously arranged to afford rotor operation according to any desired and pre-determined schedule connecting the rotational speed of the motor and the change in the total rotor driving torque.

It is also evident from Figure 1 that any partial or complete failure of the power supply will automatically cause the rotor blades to be trimmed for auto-rotation, for the same reasons that cause changes in pitch angle to be actuated by changes in total driving torque.

Referring now to Figure 2, this illustrates a form of the invention applied to a three-bladed rotor, but in which the principles underlying the mechanism are basically the same as in Figure 1. Hub 39 forming an integral part of spindle 48 is mounted on stationary spindle 38. Hub 39 and spindle 48 are driven by a gear or other suitable driving system (not shown). The rotor blades, generally designated as 41, 42, and 43, are pivotally mounted on stubs 45 in conventional or well-known fashion as described in connection with Figure 1 to form the hinges which allow changes of blade pitch. The flapping hinges 23 connect the stubs 45 to the double crank 44 and cranks 21. The cranks 44 and 21 are mounted on the hub 39 by means of pins 24, said pins 24 forming the leading or lagging hinges of the blades 41, 42, and 43. Between the double crank 44 and cranks 21 there are provided a pair of links on each side, indicated at 20 on the one hand and 22 on the other hand. The links 20 are in turn connected to each other by means of a pin 25 and the links 22 are connected to each other by means of a pin 28. It is seen that movement of the pin 25 is a measure of the algebraic sum of the leading or lagging tendencies of the blades 41 and 42, and that movement of the pin 28 is a measure of the algebraic sum of the leading or lagging tendencies of the blades 41 and 43. The operation of such links has already been clearly explained in connection with the mechanism of Figure 1. The link 26 is further pinned to hinge 25 and the link 27 to pin 28. Both links 26 and 27 are pinned together as well as to the sliding member 30 by means of pin 29. Hence, a measure of the algebraic sum of the motions of points 25 and 28 is obtained at point 29, this effect being clearly obtained by another repetition of the basic links described in connection with Figure 1. The sliding member 30 telescopes into link 31, said link 31 being freely pivotable about spindle 38. Link 32 is firmly connected to ring 33 by means of a self-aligning bearing 40. Ring 33 is free to rotate about the stationary ring 34, a ball or other suitable type bearing 35 being provided to facilitate such motion. The stationary ring 34 is rigidly connected to the non-rotating spindle 38 and has its center coincident with the rotor hub axis. Any rotation of link 31 arising from the appropriate motion of point 29 will be transferred to ring 33 by means of link 32. Furthermore, for the proper sizing of the various cranks 44 and 21 and the links 20, 22, 26, and 27, the tangential motion of point 29 can be made dependent upon the algebraic sum of the leading tendencies of all three blades, and hence the rotation of link 31 and of ring 33 is likewise made dependent solely on the algebraic sum of the leading or lagging tendencies of all of the blades. Ring 33 is attached to the blades 41, 42, and 43 by means of links 36 and the blade attachment fittings 37 and universal joints 47 and 46, the links being so arranged that a clockwise rotation of ring 33 results in an equal increase in the pitch angle of all three blades, and a counterclockwise rotation of ring 33 has the opposite effect on the several blade pitch angles.

It is clear, therefore, that the rotation of ring 33 is dependent on the algebraic sum of the leading or lagging tendencies of all three blades, and is hence dependent on the total driving torque supplied to the rotor. The change in pitch angles of the three blades is thus also dependent on the change in the total driving torque. In addition, an increase of the mean of the torques absorbed by each of the blades will result in a net increase in the sum of the lagging angles of the several rotor blades, and such an increase will cause a clockwise rotation of ring 33 and a consequent increase in the blade pitch angles. A decrease in the total driving torque, and hence in the mean of the blade torques, will conversely result in a net decrease in the sum of the blade lagging angles, and will cause ring 33 to rotate in a counterclockwise direction, and, by so doing, cause the blade pitch angles to be reduced. The change in the blade pitch angles will occur for the several blades. Any desired relationship between the change and the sum of the blade lagging angles and the change in the blade pitch angles can be attained by a proper sizing and arrangement of the elements of the mechanism described herein. Accordingly, the rotor can be arranged to operate at a constant rotational speed, or approximately so, despite any variation of the total driving torque; or else any desired or predetermined schedule between the rotational speed and the change in the total driving torque can be effectively incorporated into the rotor performance characteristics.

In the operation of the rotor, the entire mechanism of Figure 2 rotates with the hub 39, except for the inner ring 34 which is rigidly attached to the stationary spindle 38. This additional rotational motion does not in any way hamper the operation of the mechanism in the manner previously outlined. In addition, the entire mechanism of Figure 2 can be tilted by suitable controls (not shown) for the purpose of controlling rolling and pitching motion of the craft and for effecting translatory motion thereof.

Referring now to Figure 3, this illustrates a form of the invention adapted to be combined with what is known in the art as a "wobble" plate mechanism. This mechanism controls rolling and pitching motion of the craft by cyclically varying the pitch angles of the several blades during the course of the rotation. The parts indicated in Figure 3 are the same as in Figure 2 except as herein noted. Provision is now made for tilting of inner ring 34. Such tilting may be accomplished in any direction and may be controlled automatically or manually by the operator of the craft. Two control rods 50 and 51 are brought from the operator's controls and up through the center of spindle 38. The control rods 50 and 51 are rigidly attached to the links 52 and 53 respectively, said links being arranged at right angles to each other as shown. Links 52 and 53 are connected through self-aligning bearings or universal joints to the two rods 54, which are in turn connected to the stationary inner ring 34. The latter is additionally supported by arm 55 mounted rigidly on the spindle 38, and by link 56, the lower end of which (through a self-aligning bearing) is attached to inner ring 34. The inner ring 34 is freely mounted on the spherical collar 57, which is in turn journaled on the spindle 38 in such a manner as to permit its free sliding parallel to the axis of such spindle. An analysis of the action of the control rods 50 and 51 will show that the inner ring 34 can be tilted or moved around collar 57 as a center of movement in any desired manner by proper manipulation of such control rods, and that this tilting will not affect the efficiency of the automatic pitch control mechanism which comprises this invention. It is further seen that such tilting of the inner ring 34, and hence of the outer ring 33, will provide the proper cyclic variation of the pitch angles of the several blades to enable the operator to control the rolling and pitching motion of the craft.

Referring now to Figure 4, this shows a mechanism for obtaining the proper blade pitch control, utilizing a hydraulic system. As shown, this is utilized in combination with rolling and pitching control mechanism as shown in Figure 3. However, it is easily apparent that it may equally well be used with rolling and pitching control mechanism as described in connection with the mechanism of Figure 2. Blades 81, 82, and 83 are pivotally attached to the stubs 84, the attachment being hinged as described in connection with the previous figure. Stubs 84 are attached to the cranks 85, the attachment forming the blade flapping hinges 86 and the cranks being mounted on the hub 88, thus forming the leading and lagging hinges 87 of the blades 81, 82, and 83. The cranks 85 are pinned to the rods 79, which are rigidly connected to the piston 60 of the hydraulic cylinder 61. Said cylinders are mounted on the hub 88 by means of pins 62 so as to allow free rotation of the cylinders 61 about said pins. The flexible hydraulic lines 64 lead from the near end of the cylinder 61 (the end of the cylinder nearest the corresponding rotor blade) to the centrally mounted hydraulic torus 65 located between the upper and lower plates of the hub 88. In similar fashion, the flexible hydraulic line 63 extends from the opposite or far end of the cylinders 61 to a second centrally mounted hydraulic torus 66, also located between the two plates of the hub 88. Hydraulic cylinder 72 is rigidly mounted on hub 88 by means of bolts 91. Its piston rod 73 is connected to a link 90 through a joint rotatable about the axis of piston rod 73. Link 90, in turn, is connected to the outer ring 75 by means of a self-aligning bearing 74 (such bearing also permitting axial movement of link 90 with respect thereto). Hydraulic line 68 extends from the hydraulic torus 65 to the far end of the hydraulic cylinder 72 (the end farthest from the bearing 74) and the hydraulic line 67 connects the hydraulic torus 65 to the near end of the cylinder 72. Hydraulic lines 69 and 70 connect the hydraulic reservoirs 71 with the far and near ends of the hydraulic cylinder 72 respectively. The outer ring 75 rides around the inner ring 76, bearing 80 being provided for this purpose. The ring 76 is attached to the spindle 89 in a fashion similar to that shown in Figure 3. Outer ring 75 is attached to the blades 81, 82, and 83 by means of the link 77 and universal joints 78 in the manner already explained in connection with Figure 2.

Let us consider now the effect of a lagging tendency on the part of blade 81 while the positions of blades 82 and 83 remain unchanged. The consequent rotation of the crank 85 associated with the blade 81 will displace the piston 60 associated with blade 81 towards the near end of the cylinder 61. Hence, hydraulic fluid will be displaced from the near end of the cylinder to the hydraulic torus 65 via line 64, and, since the remaining blade positions are assumed unchanged, the fluid in turn will be displaced from the torus 65 to the far end of the hydraulic cylinder 72 via line 68. The piston of cylinder 72 will move towards its near end and will cause a clockwise rotation of the outer link 75, which in turn will result in an increase in pitch angles assumed by the several blades. The fluid expelled from the near end of cylinder 72, through the displacement of its piston, will be transferred via line 67 to the torus 66 and thence to the far end of the cylinder 61 associated with blade 81 via line 63, this transference of fluid being necessary from considerations of the continuity of the fluid system. The reservoirs 71 are connected with the near and far ends of cylinder 72 via lines 70 and 69 respectively and are provided to account for fluid losses in any part of the system due to leakage or other reasons.

From the preceding discussion, it is seen that a tendency of one blade to decrease or increase its angle of lag, the other blades being stationary, will result in a decrease or increase respectively in the pitch angles of all the blades in a fashion similar to that previously described in connection with Figures 1, 2, and 3. By a proper sizing of the hydraulic cylinders, any desired relation between the blade pitch change and total driving torque change can be effected. Hence the rotor can be made to operate at either a constant rotational speed or approximately so, or else according to any desired and pre-determined schedule between change of rotational speed and change of total driving torque.

Referring now to Figure 5, this is a fragmentary view illustrating an arrangement of the flapping and lagging hinges which may be substituted for the arrangements shown in Figures 1, 2, 3, and 4. In this arrangement the flapping hinge 101 is located inboard of the lagging hinge 102. Otherwise, however, the arrangement functions exactly the same as in the other drawings shown. In the drawings, the rotor blade 100 is pivotally mounted on a stub 103 in a fashion similar to that described in connection with the other forms of the invention. The stub 103 has an arm 104 and a pin 105 forming an integral part thereof. The pin 105 rides in a slot forming a part of double crank 106, the latter in turn being connected to links 20 and 22, similar to the corresponding links in Figure 2, and being pivotally mounted on hub 109 through pin 116. Alternatively, pin 105 may actuate hydraulic pistons as shown in Figure 4, instead of a crank 106. Stub members 103 of the remaining rotor blades actuate cranks or hydraulic pistons in an analogous fashion. The average leading or lagging movement of all the blades is translated into rotational movement of ring 111 through pin 112 in a fashion previously described in connection with the other forms of the invention. Ring 111 in turn is connected to blade fitting attachments 114 by means of link 115 provided at top and bottom with universal joints 113. The axis of lower universal joint 113 coincides substantially with the axis of the flapping hinge 101, for reasons already described in connection with the other forms of the invention.

Stub member 103 is connected to a member 107 by means of a pin 102 forming a leading and lagging hinge. Member 107 is in turn connected to a hub member 109 by means of a pin 108 forming a flapping hinge. The hub 109 rotates on a spindle 110 in a fashion similar to that shown in Figures 1 and 2.

By reference to the above description, it is seen that the present invention possesses a number of advantages, all of which result in smoother, safer, and better helicopter operation. Some of these advantages may be enumerated as follows:

1. The pitch angle of the rotor blades is automatically responsive to variations of the total effective driving torque applied to the rotor hub, usually referred to as the "total driving torque," thereby eliminating the necessity for manual adjustment on the part of the operator of the pitch angles of the blades.

2. The rotational velocity of the rotor is automatically limited to either a constant or an approximately constant value, without the need of manual control on the part of the operator, or else the rotational velocity of the rotor is automatically dependent upon the total driving torque according to a fixed and pre-determined change of velocity—change of torque schedule, also without the need for manual control on the part of the operator.

3. The angles of attack assumed by the multiple rotor blades change simultaneously with change in driving torque, and are of the same value or differ by a pre-determined amount depending on the setting of an appropriate manual control. Thus, any change in the mean of the torque absorbed by each of the rotor blades, and hence any change in the total driving torque results in a simultaneous change in the angles of attack of all of the rotor blades.

4. The rotor blades automatically assume pitch angles which will result in autorotation when the total driving torque becomes less than some predetermined value, without the necessity for manual control on the part of the operator.

5. Changes in angles of attack due to change in total driving torque may be coordinated with other means for controlling the motion of the aircraft. Such other means for example may cause the rotary blades to cyclically assume angles of attack which differ one from the other by a pre-determined but variable amount, dependent on the rotational position of the rotor and on the setting of an appropriate manual control.

In connection with these advantages it will be noted that, in the preferred form of the invention, the pitch control mechanism for each blade is not responsive to changes in torque absorbed by that blade but to the average torque absorbed by the several blades. Since the torque absorbed by each blade cyclically varies between a value greater than and a value less than the mean of the individual torques of the separate rotor blades, due to changes in the air velocity relative to a particular blade, the pitch of these individual blades will cyclically vary unless the pitch control mechanism is dependent on the average torque absorbed by the separate blades. The latter mechanism will eliminate certain vibrating characteristics and tendencies which are inherent in the former type of pitch control mechanism.

The above discussion has been in connection with several specific forms of the invention. It is obvious, however, that many changes may be made in these forms without departing from the spirit of the invention. For example, the connection between the leading or lagging movements of the rotor blades and the pitch control mechanism may be electrical instead of mechanical as shown in Figures 1, 2, and 3, or hydraulic as shown in Figure 4. Likewise, in connection with Figure 2, the linkage between control point 29 and outer link 33 may be direct instead of through links 31 and 32, by a suitable rearrangement of the mechanism. Similarly, in connection with all forms of the invention, link 31 (see Figure 2) may be pivoted off center from the axis of rotation of the entire mechanism.

Where the phrase "substantially in the plane of rotation of the rotor blades" is used in this specification and claims, this is understood to refer to rotation in a true plane or to rotation in a shallow conical surface, caused by flapping movement of the blades.

We claim:

1. In a helicopter having a multiple bladed motor driven rotor, mechanism for automatically increasing the angle of attack of the blades of the rotor as a result of increasing engine torque and for automatically decreasing the angle of attack of the blades of the rotor as a result of decreasing engine torque, said mechanism comprising rotor blades pivotally mounted for changes in pitch and pivotally mounted for swinging motion substantially in the plane of rotation of said rotor blades, means moving in response to the algebraic sum of said swinging motion of all individual rotor blades of said rotor in the plane of rotation of said rotor blades, and means for translating motion of said first mentioned means into changes of pitch of said rotor blades.

2. In a helicopter having a multiple bladed motor driven rotor, mechanism for automatically increasing the angle of attack of the blades of the rotor as a result of increasing engine torque and for automatically decreasing the angle of attack of the blades of the rotor as a result of decreasing engine torque, said mechanism comprising rotor blades pivotally mounted for changes in pitch and pivotally mounted for swinging motion substantially in the plane of rotation of said rotor blades, unitary means moving in response to the algebraic sum of said swinging motion of all individual rotor blades of said rotor in the plane of rotation of said rotor blades, and means for translating motion of said first mentioned means into equal changes of pitch of each of said rotor blades.

3. In a helicopter having a multiple bladed motor driven rotor, mechanism for automatically increasing the angle of attack of the blades of the rotor as a result of increasing engine torque and for automatically decreasing the angle of attack of the blades of the rotor as a result of decreasing engine torque, said mechanism comprising rotor blades pivotally mounted for changes in pitch and pivotally mounted for swinging motion substantially in the plane of rotation of said rotor blades, rotatable means rotating in response to the algebraic sum of said swinging motion of the separate rotor blades, said rotatable means being mounted for rotation substantially about the center of rotation of said rotor blades, and means for translating said rotational movement into equal changes of pitch of each of said rotor blades.

4. In a helicopter having a multiple bladed motor driven rotor, mechanism for automatically increasing the angle of attack of the blades of the rotor as a result of increasing engine torque and for automatically decreasing the angle of attack of the blades of the rotor as a result of decreasing the engine torque, said mechanism comprising rotor blades pivotally mounted for changes in pitch, pivotally mounted for flapping movement and pivotally mounted for swinging motion substantially in the plane of rotation of said rotor blades, means for additively translating said swinging motion of the separate rotor blades into rotational movement of a member rotating substantially about the center of rotation of said rotor blades, and linkages connecting said rotating member with each of said rotor blades by means of universal joints, said linkages being adapted to translate rotational movement of said rotating member into equal changes of pitch of each of said rotor blades, and the universal joints at the ends of said linkages towards said rotor blades having their centers of movement located substantially along the axes of the pivotal mountings for flapping movement of their respective rotor blades.

5. In a helicopter having a multiple bladed motor driven rotor, mechanism for automatically increasing the angle of attack of the blades of the rotor as a result of increasing engine torque and for automatically decreasing the angle of attack of the blades of the rotor as a result of decreasing engine torque, said mechanism comprising a spindle, a hub rotatably mounted on said spindle and rotationally driven by the main power plant of the helicopter, a plurality of rotor blades pivotally connected to said hub, to permit independent swinging motion substantially in the plane of rotation of said rotor blades, separate cranks actuated by said swinging motion of each of said rotor blades, a rotating member mounted for rotational movement substantially about the center of rotation of said rotor blades, linkages connecting said cranks to said rotating member, said linkages permitting independent swinging motion of said rotor blades but additively actuating rotation of said rotating member, and other linkages attached to each rotor blade and mounted for actuating changes of pitch of said rotor blades, said other linkages being actuated by rotational movement of said rotating member.

6. In a helicopter having a multiple bladed motor driven rotor, mechanism for automatically increasing the angle of attack of the blades of the rotor as a result of increasing engine torque and for automatically decreasing the angle of attack of the blades of the rotor as a result of decreasing engine torque, said mechanism comprising a spindle, a hub rotatably mounted on said spindle and rotationally driven by the main power plant of the helicopter, a plurality of rotor blades pivotally connected to said hub to permit independent swinging motion substantially in the plane of rotation of said rotor blades, hydraulic cylinders associated with each of said rotor blades, pistons in each of said hydraulic cylinders, said pistons being actuated by said swinging motion of each of said rotor blades, hydraulic fluid additively actuated by said pistons, a master hydraulic cylinder having a master piston actuated by said hydraulic fluid, a rotating member mounted for rotational movement substantially about the center of rotation of said rotor blades, a linkage for translating motion of said master piston into rotational movement of said rotating member, and other linkages attached to each rotor blade and mounted for actuating changes of pitch of said rotor blades, said other linkages being actuated by rotational movement of said rotating member.

7. In a helicopter having a multiple bladed motor driven rotor, mechanism for automatically increasing the angle of attack of the blades of the rotor as a result of increasing engine torque and for automatically decreasing the angle of attack of the blades of the rotor as a result of decreasing engine torque, said mechanism comprising a spindle, a hub rotatably mounted on said spindle and rotationally driven by the main power plant of the helicopter, a plurality of rotor blades each pivotally connected to said hub by means of at least three hinges, one of said hinges having its axis substantially along a radius extending from the center of rotation in the plane of rotation of said rotor blades so as to permit changes of pitch of its associated rotor blade, a second of said hinges having its axis substantially at right angles to said first hinge and substantially in the plane of rotation of said rotor blades so as to permit flapping movement of said rotor blade, and a third of said hinges having its axis substantially parallel to the axis of rotation of said hub so as to permit swinging motion of its associated rotor blade substantially in the plane of rotation of said rotor blades, separate cranks actuated by said swinging motion of each of said rotor blades, a rotating member mounted for rotational movement substantially about the center of rotation of said rotor blades, linkages connecting said cranks to said rotating member, said linkages permitting independent swinging motion of said rotor blades but additively actuating rotation of said rotating member, and other linkages connecting said rotating member with each of said rotor blades by means of universal joints, said other linkages being adapted to translate rotational movement of said rotating member into equal changes of pitch of each of said rotor blades, and the universal joints at the ends of said other linkages towards said rotor blades having their centers of movement located substantially along the axes of the said flapping hinges of their respective rotor blades.

8. In a helicopter having a multiple bladed motor driven rotor, mechanism for automatically increasing the angle of attack of the blades of the rotor as a result of increasing engine torque and for automatically decreasing the angle of attack of the blades of the rotor as a result of decreasing engine torque, said mechanism comprising a spindle, a hub rotatably mounted on said spindle and rotationally driven by the main power plant of the helicopter, a plurality of rotor blades each pivotally connected to said hub by means of at least three hinges, one of said hinges having its axis substantially along a radius extending from the center of rotation in the plane of rotation of said rotor blades so as to permit changes of pitch of its associated rotor blade, a second of said hinges having its axis substantially at right angles to said first hinge and substantially in the plane of rotation of said rotor blades so as to permit flapping movement of said rotor blade, and a third of said hinges having its axis substantially parallel to the axis of rotation of said hub so as to permit swinging motion of its associated rotor blade substantially in the plane of rotation of said rotor blades, hydraulic cylinders associated with each of said rotor blades, pistons in each of said hydraulic cylinders, said pistons being actuated by said swinging motion of each of said rotor blades, hydraulic fluid additively actuated by said pistons, a master hydraulic cylinder having a master piston actuated by said hydraulic fluid, a rotating member mounted for rotational movement substantially about the center of rotation of said rotor blades, a linkage for translating motion of said master piston into rotational movement of said rotating member, and other linkages connecting said rotating member with each of said rotor blades by means of universal joints, said other linkages being adapted to translate rotational movement of said rotating member into equal changes of pitch of each of said rotor blades, and the universal joints at the ends of said other linkages towards said rotor blades having their centers of movement located substantially along the axes of the said flapping hinges of their respective rotor blades.

EDWARD S. JENKINS.
ALLEN F. DONOVAN.